U S006956585B2

United States Patent
Muraki et al.

(10) Patent No.: US 6,956,585 B2
(45) Date of Patent: Oct. 18, 2005

(54) IMAGE COMPOSING SYSTEM AND A METHOD THEREOF

(75) Inventors: Shigeru Muraki, Tokyo (JP); Masato Ogata, Kamakura (JP)

(73) Assignees: National Institute of Advanced Industrial Science and Technology, Tokyo (JP); Mitsubishi Precision Co., Ltd., Tokyo (JP)

( * ) Notice: Subject to any disclaimer, the term of this patent is extended or adjusted under 35 U.S.C. 154(b) by 129 days.

(21) Appl. No.: 10/291,854

(22) Filed: Nov. 8, 2002

(65) Prior Publication Data

US 2003/0201998 A1 Oct. 30, 2003

(30) Foreign Application Priority Data

Apr. 26, 2002 (JP) .................................... 2002-126952

(51) Int. Cl.[7] .................................................. G09G 5/00
(52) U.S. Cl. ...................... 345/629; 345/631; 345/634; 345/637
(58) Field of Search ................................ 345/629, 631, 345/634, 637

(56) References Cited

U.S. PATENT DOCUMENTS

| 4,559,533 A | * | 12/1985 | Bass et al. | 345/790 |
| 5,731,799 A | * | 3/1998 | Kee et al. | 345/634 |
| 5,838,310 A | * | 11/1998 | Uya | 345/536 |
| 6,411,302 B1 | * | 6/2002 | Chiraz | 345/545 |
| 6,606,413 B1 | * | 8/2003 | Zeineh | 382/232 |
| 2003/0020757 A1 | * | 1/2003 | Aratani et al. | 345/790 |

OTHER PUBLICATIONS

Muraki, et al., Next–Generation Visual Supercomputing using PC Clusters with Volume Graphics Hardware Devices, ACMI/IEEE SC2001 Conference, Nov. 10–16, Denver, Colorado.

* cited by examiner

Primary Examiner—Matthew C. Bella
Assistant Examiner—Mike Rahmjoo
(74) Attorney, Agent, or Firm—Christie, Parker and Hale, LLP

(57) ABSTRACT

The present invention provides an image composing apparatus that can composite images at high speed and in which the apparatus configuration can be easily expanded as the number of images to be composed increases.

Sub-images generated by node computers are synchronized each other by a synchronizing section. Then, each pair of synchronized sub-image data is composed into a single sub-image in a first-layer image composing section, comprising a plurality of image composing circuits each for composing two sub-images, and the resulting sub-images are composed iteratively through a second-layer image composing section, a third-layer image composing section, and so on, that have the same configuration as the first-layer image composing section.

6 Claims, 14 Drawing Sheets

Fig.9

| | | 35···32 | 31···24 | 23···16 | 15···8 | 7···0 TRANSPARENCY |
|---|---|---|---|---|---|---|
| COMMAND | DUMMY | 0 | – | – | – | – |
| | PIXEL DATA | 1 | RED | GREEN | BLUE | – |
| | CHANNEL ENABLE | 2 | 1 | – | – | – |
| | CHANNEL DISABLE | 2 | 2 | – | – | – |
| | SET PRIORITY | 2 | 4 | – | PRIORITY (9 BITS) | |
| | FIFO RESET | 2 | 8 | – | – | – |
| | FLAME START | 2 | 16 | – | – | – |
| | FLAME END | 2 | 32 | – | – | – |
| STATUS | CHANNEL NOT READY | 4 | 1 | – | – | – |
| | PIXEL COUNT MISMATCH | 4 | 2 | – | – | – |
| | ILLEGAL COMMAND | 4 | 4 | – | – | – |

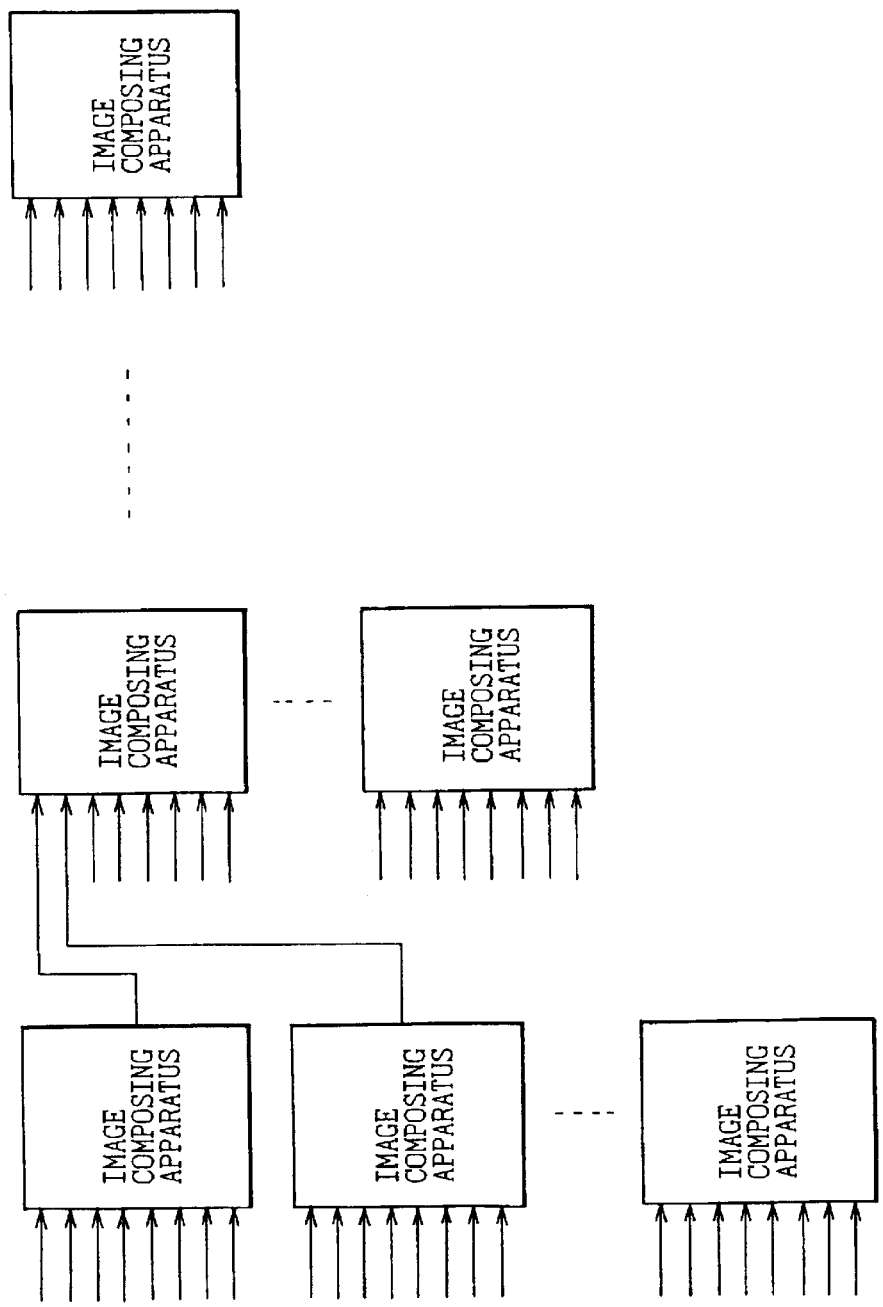

IMAGE COMPOSING SYSTEM AND A METHOD THEREOF

CROSS-REFERENCE TO RELATED APPLICATION

This application claims priority of Japanese Patent Application Number 2002- 126952, filed Apr. 26, 2002.

TECHNICAL FIELD OF THE INVENTION

The present invention relates to an image composing apparatus and method, and more particularly an image composing apparatus and method that can compose images at high speed and in which the apparatus configuration can easily be expanded in proportion to the number of images to be composed.

PRIOR ART

To intuitively grasp the results of computer processing, the results must be presented in visible form. However, as the scale of processing becomes larger, it becomes difficult to generate necessary images using a single computer. Therefore, it is often practiced to compose images using a plurality of computers.

FIG. 1 is a block diagram of an image composing apparatus proposed in the prior art, which comprises N node computers $F_1, F_2 \ldots F_N$ and an N×N crossbar switch S for enabling the N node computers $F_1, F_2 \ldots F_N$ to communicate with each other.

Each of image composing boards $C_1, C_2 \ldots C_N$ which are dedicated cards for composing images, is connected to a PCI bus on each node computer $F_n$, and each of the image composing boards $C_1, C_2 \ldots C_N$ are connected to each other via the crossbar switch S.

In the image composing apparatus having the above configuration, the image composing board $C_n$ on one node computer $F_n$ composites an image generated in itself with an image generated in the image composing board $C_m$ (m≠n) on another node computer $F_m$, and the composed image is transferred to the third node computer $F_k$ via the crossbar switch S. This process is repeated till a final image is generated.

The above image composing apparatus uses a method in which the images generated by separate node computers are composed together based on a parameter called "Z value" that denotes an image composing order. Though the apparatus can respond flexibly to increasing the number of node computers, it involves following problems.

(1) The Z value denoting the depth from a viewpoint must be added for data of each pixel, but since the Z value must be highly accurate compared with other information (red component R, green component G, blue component B, and transparency α), adding the Z value almost doubles the number of bits in the image data, and the amount of image data to be transmitted increases.

(2) To avoid collisions during transferring image data, a waiting time is necessary, and this waiting time increases the time required for transferring image data.

(3) In order to reduce the image data transferring time, the hardware configuration must be increased, because the crossbar switch, for example, should be specially designed to match with each node computer.

Therefore, in the above image composing apparatus, when the number of node computers is increased.

(1) The scale of the crossbar switch may exceed the practically feasible scale as it increases as the square of the number of node computers.

(2) If the number of node computers is limited to the practically feasible number, the time required for establishing synchronization between the images to be composed increases, and an image composing time increases.

SUMMARY OF THE INVENTION

The present invention has been devised in view of the above problems and an object of the invention is to provide an image composing apparatus and method that can compose images at high speed and in which the apparatus configuration can be easily expanded as the number of images to be composed increases.

According to an image composing apparatus and method of a first invention, N (2≦N) sub-images are merged into a single image based on an occlusion relationship between the N sub-images.

According to an image composing apparatus and method of a second invention, the occlusion relationship is expressed in the form of a binary space-partitioning tree.

According to an image composing apparatus and method of a third invention, input sub-images are composed to generate an output sub-image by iteratively composing two sub-images into one image based on the occlusion relationship between two sub-images.

According to an image composing apparatus and method of a fourth invention, the two sub-image composing process compares priorities which denote the occlusion relationship between the two sub-images, and generates a composed image based on the result of the priority comparison by composing one sub-image which is defined as a first sub-image with another sub-image which is defined a second sub-image.

According to an image composing apparatus and method of a fifth invention, the two sub-images are composed together in accordance with the following equation.

$$I(R,G,B)_M = I(R,G,B)_1 * I(\alpha)_1 + I(R,G,B)_2$$

$$I(\alpha)_M = I(\alpha)_1 * I(\alpha)_2$$

Where $I(R,G,B)_M$ are the RGB components of the composed image, $I(R,G,B)_1$ are the RGB components of the first sub-image, $I(R,G,B)_2$ are the RGB components of the second sub-image, $I(\alpha)_M$ is the transparency of the merged image, $I(\alpha)_1$ is the transparency of the first sub-image, and $I(\alpha)_2$ is the transparency of the second sub-image.

According to an image composing apparatus and method of a sixth invention, the sub-images are synchronized to each other before merging the sub-images.

According to an image composing apparatus and method of a seventh invention, N sub-images are sequentially stored in N FIFO storing means, and when the head of any one of the N sub-images arrives at any one of the N FIFO storing means, an instruction to output the stored sub-images in the order in which the sub-images were stored is issued to the N FIFO storing means.

According to an image composing apparatus and method of an eighth invention, the plurality of sub-image data have frame structures which contain a priority information at the top of the frame and a sub-image information at the end of the frame.

BRIEF DESCRIPTION OF THE DRAWINGS

FIG. 9 is a bit allocation diagram for time slots.

FIG. 14 is a diagram showing the configuration of a multi-layer image composing apparatus.

DETAILED DESCRIPTION OF THE PREFERRED EMBODIMENTS

Figure 1:
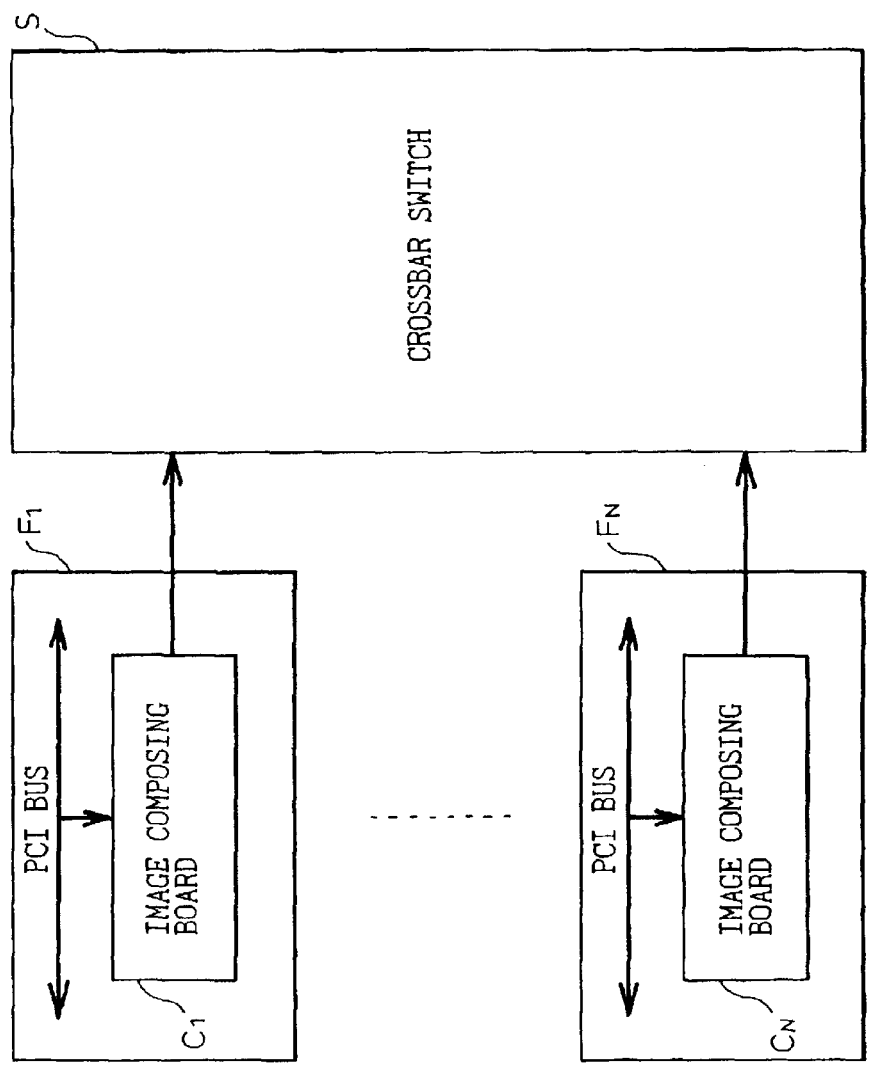
FIG. 1 is a diagram showing the configuration of a conventional image composing apparatus.
Figure 2:
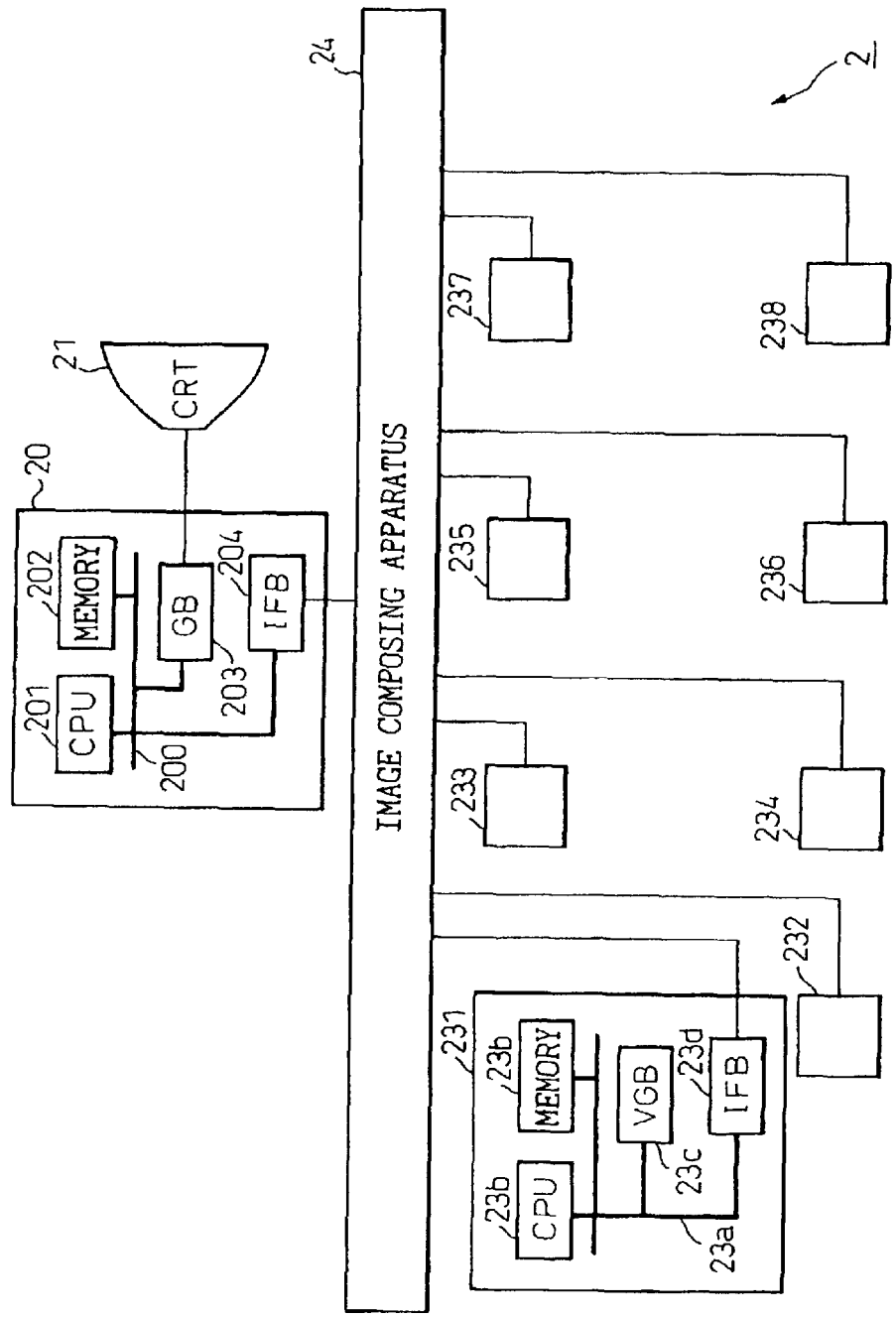
FIG. 2 is a diagram showing the configuration of a composed image generating system using an image composing apparatus according to the present invention.

FIG. 2 is a diagram showing the configuration of a composed image generating system using an image composing apparatus according to the present invention. As shown, the composed image generating system 2 comprises a server 20 which controls the entire apparatus, a display device (for example, a CRT) 21 which displays an image, a plurality of nodes (in the present embodiment, eight nodes) 231 to 238 which generate sub-image signals for a plurality of subspaces created by dividing the three-dimensional space in which an analysis model is constructed, and the image composing apparatus 24 which composes the outputs of the nodes 231 to 238 and transmits a composed result to the server 20.

The server 20 comprises a CPU 201, a memory 202 which stores a program to be executed by the CPU 201 and the result of processing performed by the CPU 201, a graphics board (GB) 203 which outputs an image signal to the display apparatus 21, and an interface board (IFB) 204 for interfacing with the image composing apparatus 24.

The nodes 231–238 have an identical configuration, and each node comprises a CPU 23b which performs simulation for the subspace in which a portion of an analysis target is constructed, a memory 23b which stores a simulation program to be executed by the CPU 23b and the simulation result performed by the CPU 23b, an image generating engine board (VGB) 23c which generates an image representing the result of the simulation for the subspace, and an interface board (IFB) 23d for interfacing with the image composing apparatus 24.

Figure 3:
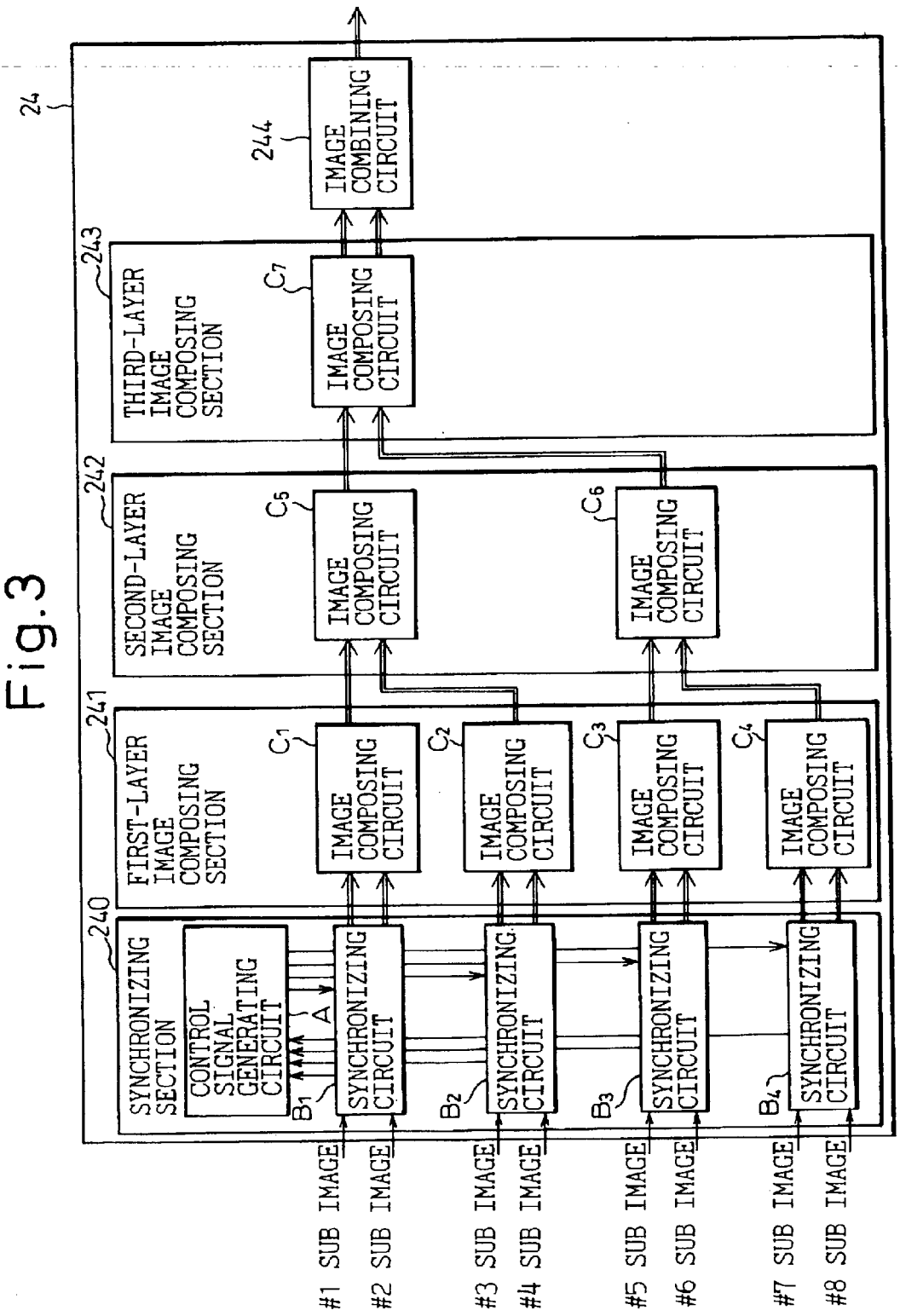
FIG. 3 is a diagram showing the configuration of the image composing apparatus according to the present invention.

FIG. 3 is a diagram showing the configuration of the image composing apparatus, according to the present invention, which comprises a synchronizing section 240, a first-layer image composing section 241, a second-layer image composing section 242, a third-layer image composing section 243, and an image combining circuit 244.

Figure 4:
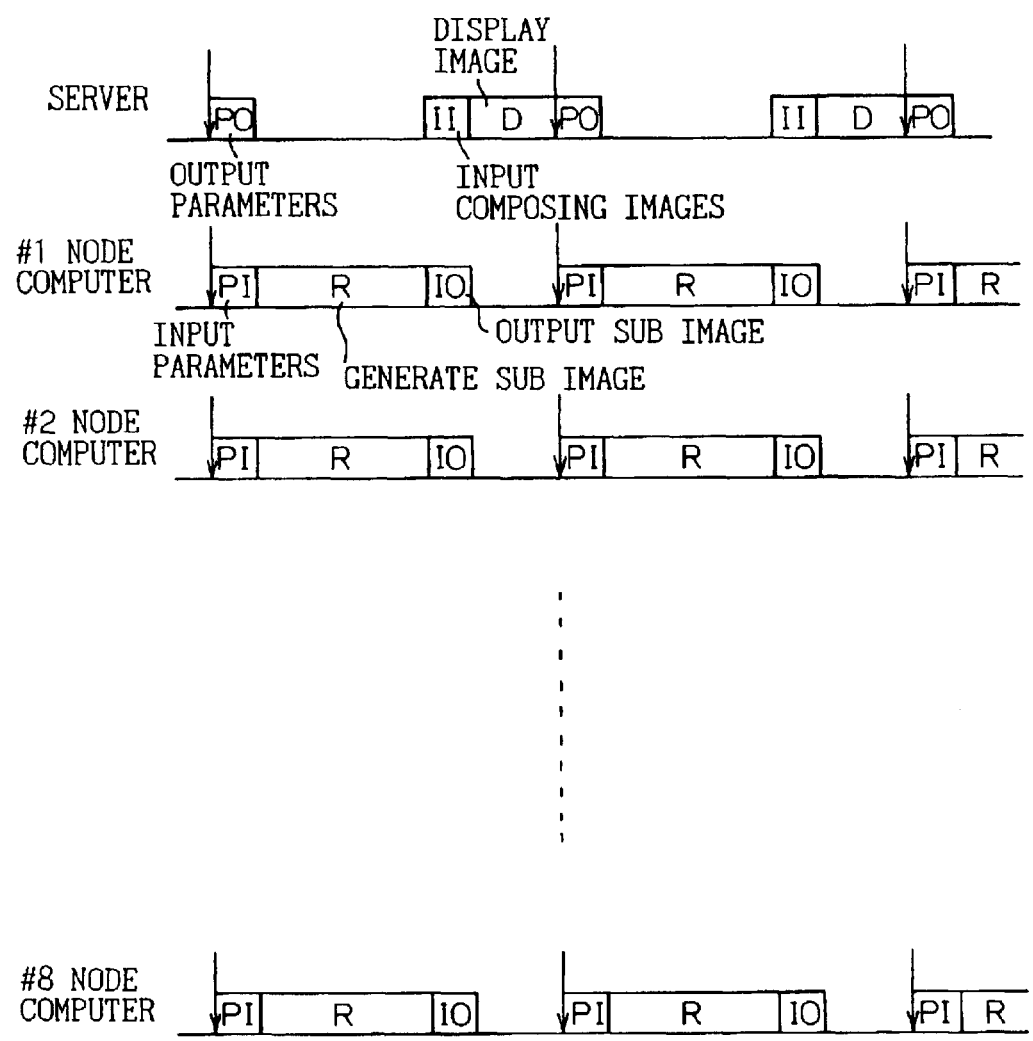
FIG. 4 is a timing diagram for data transfer between the image composing apparatus and node computers.

FIG. 4 is a data transferring timing diagram between the image composing apparatus and the node computers. As shown, the image composing apparatus 24 receives a parameter necessary for image generation from the server and distributes the parameter to the respective node computers 231–238 every predetermined period, and each of the node computers 231–238 receives the parameter and generates a sub-image.

After generating sub-images, the node computers 231–238 transfer the sub-images to the image composing apparatus 24, which composes the sub-images output from the node computers 231–238 and transfers the composed image to the display device 21 though the server 20.

Because each of the node computers 231–238 generally works independently, synchronization of the timings when the sub-images arrive at the image composing apparatus 24 is not guaranteed.

Figure 5:
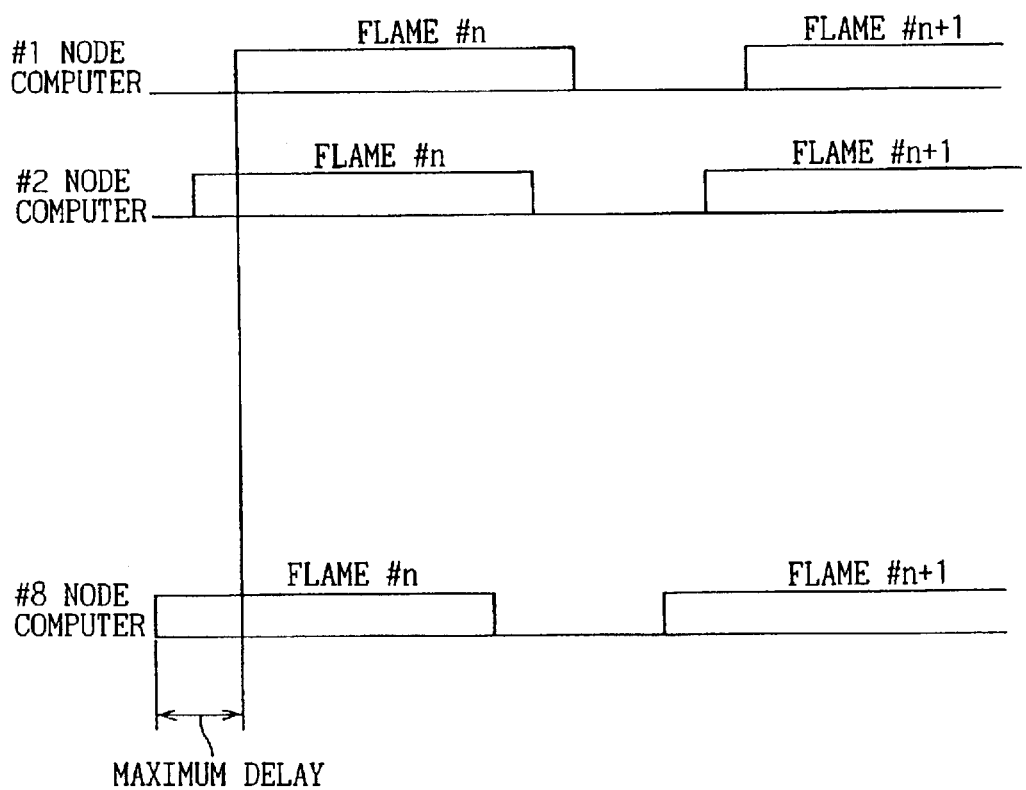
FIG. 5 is a sub-image output-timing diagram of the node computers.

FIG. 5 is a sub-image output timing diagram of the node computers, and this shows a case where the first sub-image of #n frame is output from the first node computer 231 and the last sub-image of #n frame is output from the eighth node computer 238.

In this case, if each of the node computers 231–238 stores the entire of #n frame, and begins to transfer the #n frame to the first-layer image composing section 241 after the last part of the #n frame output from the last node computer (in this example, the eighth node computer 238) is stored, synchronization among the sub-images can be achieved.

However, storing the entire of #n frame requires not only a large capacity of memory, but also long time to store the entire of #n frame.

Therefore, the image composing apparatus of the present invention accomplishes not only synchronizing among sub-images, but also shortening the synchronizing time and minimizing the memory capacity, by providing a synchronizing section 240 at the interface of the node computers, and beginning to transfer the frame of the sub-image to the first-layer image composing section 241 at the timing when the beginning parts of the sub-images frame output from node computers are aligned.

As shown in FIG. 3, the synchronizing section 240 in the image composing apparatus of the present invention comprises a control signal generating circuit A and four synchronization circuits $B_1$–$B_4$ which have identical configurations.

Figure 6:
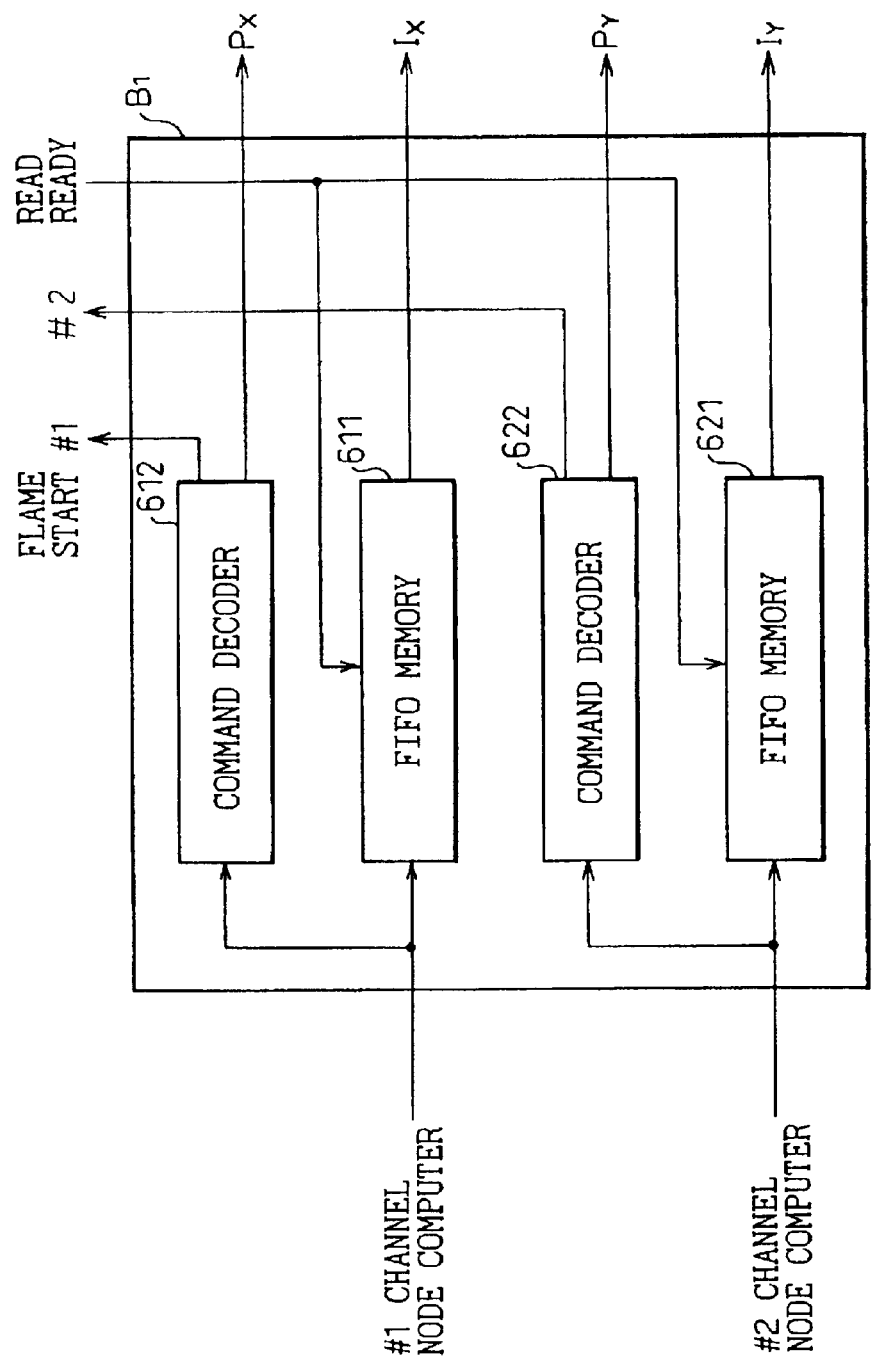
FIG. 6 is a diagram showing the configuration of a synchronization circuit.
Figure 7:
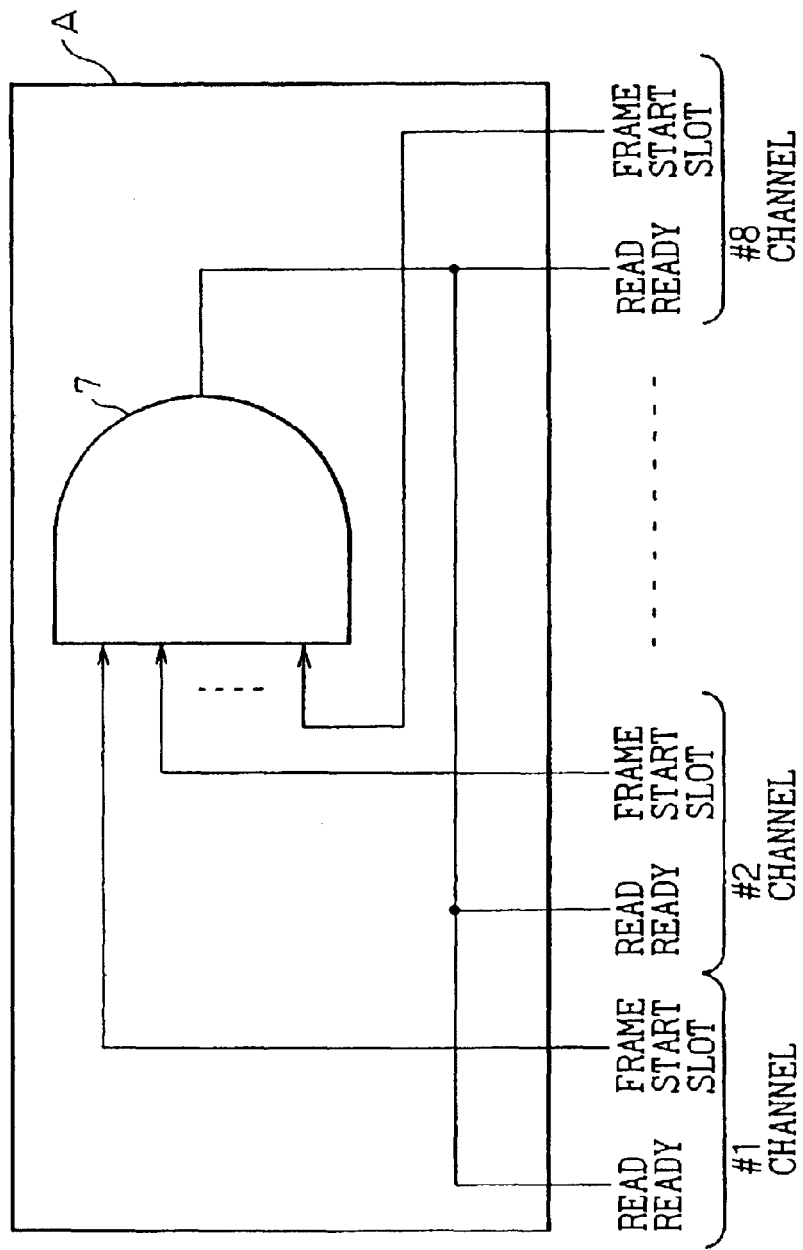
FIG. 7 is a diagram showing the configuration of a control signal generating circuit.

FIG. 6 is a diagram showing the configuration of each synchronization circuit, and FIG. 7 is a diagram showing the configuration of the control signal generating circuit.

As shown, the synchronization circuit $B_i$ has two channels: the first channel comprises a FIFO memory 611 and a command decoder 612 connected in parallel with the FIFO memory 611, while the second channel comprises a FIFO memory 621 and a command decoder 622 connected in parallel with the FIFO memory 621.

The first channel works as follows. The FIFO memory 611 sequentially stores the pixel data of the sub-image frame output from the node computer connected to the first channel until READ READY output from the control signal generating circuit A has been received, and outputs the pixel data ($I_x$) in the same order when they were stored.

The command decoder 612 extracts a priority set (a channel enable and a set priority) contained in the sub-image frame output from the node computer connected to the first channel, and a frame start command and a status sense contained in the frame data. The start command is transferred to the control signal generating circuit A and a 9-bit priority value ($P_X$) contained in the set priority is transferred to the first-layer image merging section.

The operation of the second channel is the same as that of the first channel, except that the pixel data output from the FIFO memory 621 is $I_Y$ and the priority value is $P_Y$ output from the command decoder.

Figure 8:
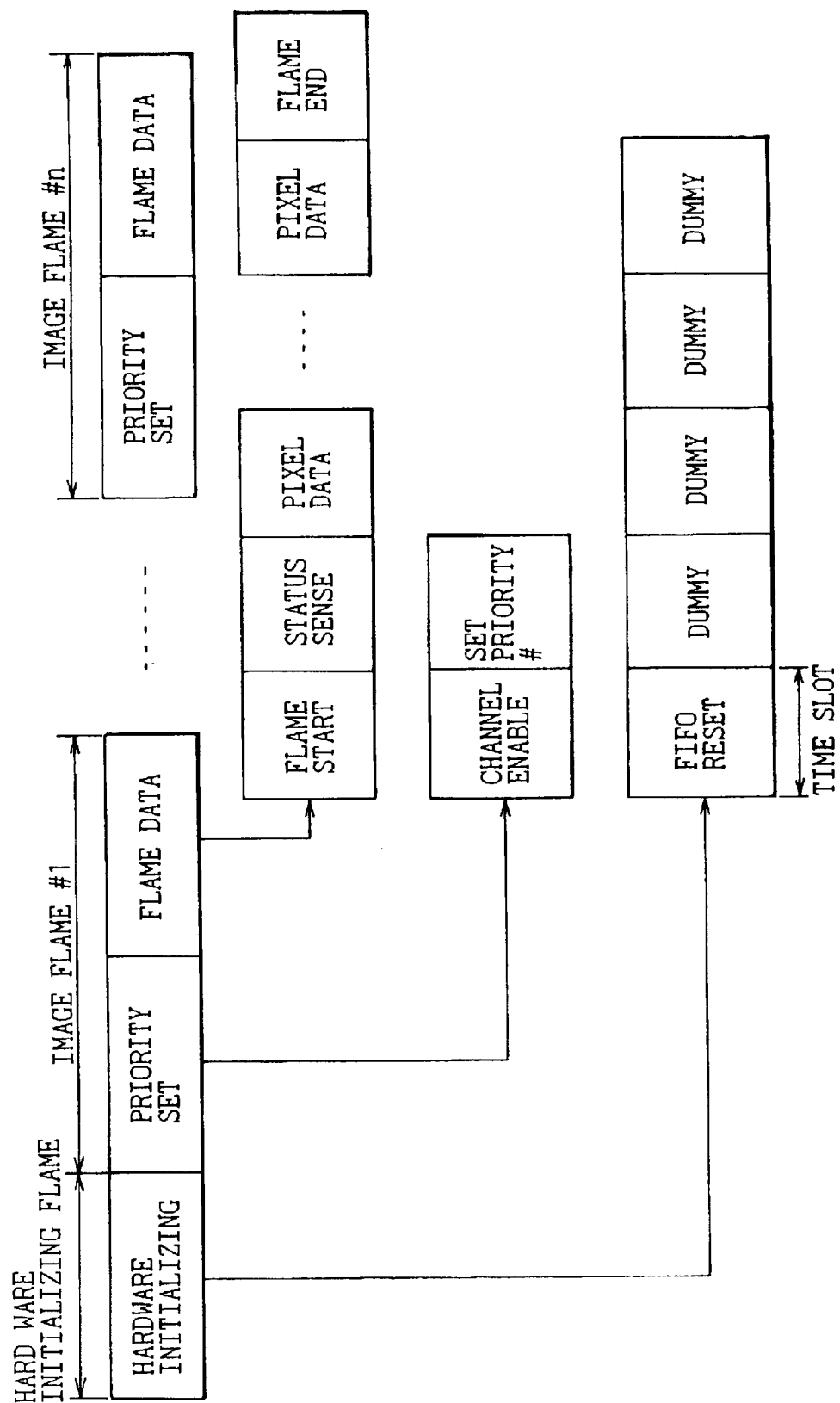
FIG. 8 is a diagram showing the format of sub-image data.

FIG. 8 is a diagram showing the format of the sub-image frame output from each node computer, and FIG. 9 is a bit allocation diagram for time slots. Each of the frame computers 231–238 outputs a hardware initialization frame to initialize the image composing apparatus at first, and then sequentially outputs the sub-image frames.

The hardware-initializing frame contains a FIFO reset slot and four dummy slots, and resets the FIFO memory in the synchronization circuit.

The image frame comprises the priority set and frame data, and the priority set contains a channel enable slot and a set priority slot.

The channel enable slot indicates that the channel is in use, and the set priority slot carries the priority given to the sub-image generated by the node computer.

The frame data comprises a frame start slot, a status sense slot, a predetermined number of pixel data slots, and a frame end slot.

The frame start slot denotes the beginning of the frame data, and the frame end slot denotes the end of the frame data.

Each of the pixel data slots stores the red, green, and blue components and the transparency ($\alpha$ value) of each pixel in the sub-image.

Each slot consists of 36 bits, which are allocated as shown in FIG. 9 according to the kind of the slot.

For example, in the set priority slot, the priority is set by using the lower 9 bits in No. 0–15 bits, and "4" is set in No. 24–31 bits and "2" in No. 32–35 bits to show that this slot is a set priority slot.

Likewise, in the pixel data slot, "1" is set in No. 32–35 bits to show that this slot is a pixel data slot. Further, No. 24–31 bits store the red component, No. 16–23 bits store green component, No. 8–15 bits store the blue component, and No. 0–7 bits store the transparency.

The control signal generating circuit A shown in FIG. 7 comprises eight-input AND gate 7, and the frame start slots extracted by the command decoders in the respective synchronization circuits are transferred to the inputs of AND gate 7.

Then, when the eight frame start slots of #n frame are detected, a FIFO read signal, that is, the output of the AND gate 7, becomes "ON", whereupon the frame data stored in the FIFO memories in the synchronization circuits are read out in the same order when they were stored, and are transferred to the first-layer image composing section.

The pixel data are maintained in the FIFO memories until all of the starting portions of the eight #n frames output from the node computers 231–238 arrive at the synchronizing section. When the starting portion of the eighth #n frame arrives at the synchronizing section, the control signal generating circuit A sets the FIFO read signal ON, and the data of the eight frames is simultaneously transferred to the first-layer image merging section 241. The synchronization among the frame data is accomplished.

Since a single clock controls the image composing apparatus 24, synchronization is guaranteed in the processing after the first-layer image merging section 241.

The first-layer image composing section 241 comprises four image composing circuits $C_1$–$C_4$, the second-layer image merging section 242 comprises two image composing circuits $C_5$ and $C_6$, and the third-layer image composing section 243 comprises one image merging circuit $C_7$. The image composing circuits $C_i$ ($1 \leq i \leq 7$) have identical configurations.

In the first-layer image composing section 241, the first image composing circuit $C_1$ composes the sub-images generated by the first node computer 241 and the second node computer 242 after being synchronized each other. Likewise, the sub-images generated by the third node computer 243 and the fourth node computer 244 are composed in the second image composing circuit $C_2$, the sub-images generated by the fifth node computer 245 and the sixth node computer 246 are composed in the third image composing circuit $C_3$, and the sub-images generated by the seventh node computer 247 and the eighth node computer 248 are composed in the fourth image composing circuit $C_4$.

In the second-layer image composing section, the sub-images output from the first image composing circuit $C_1$ and the second image composing circuit $C_2$ are composed in the fifth image composing circuit $C_5$, while the sub-images output from the third image composing circuit $C_3$ and the fourth image composing circuit $C_4$ are composed in the sixth image composing circuit $C_6$.

In the third-layer image composing section, the sub-images output from the fifth image composing circuit $C_5$ and the sixth image composing circuit $C_6$ are composed by the seventh image composing circuit $C_7$.

Hereafter, the sub-image composing method to be employed in the image composing apparatus of the present invention will be described.

Figure 10:
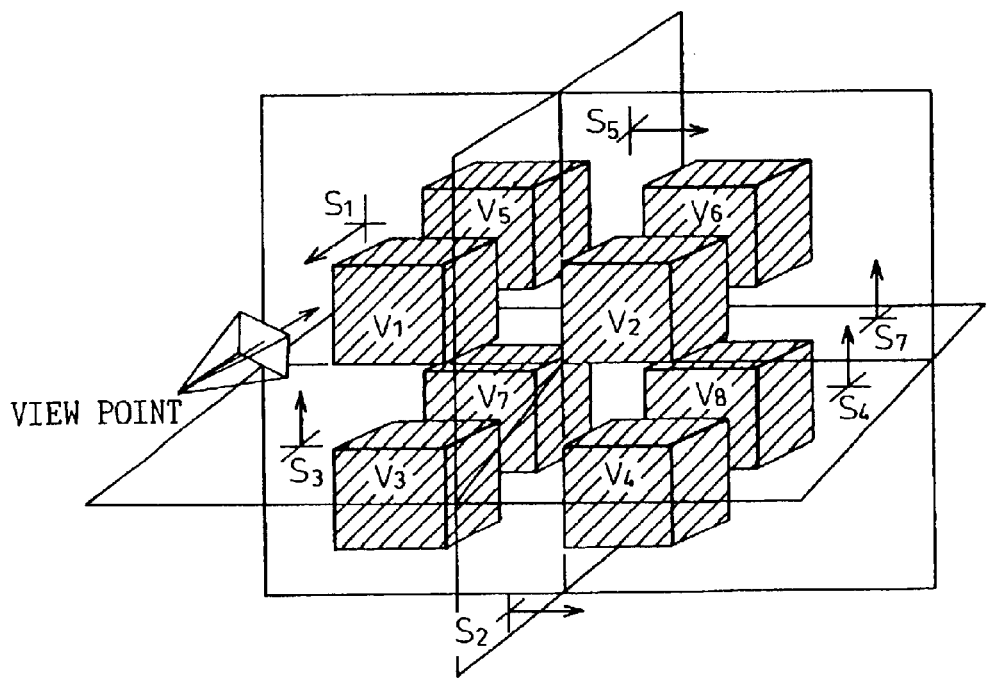
FIG. 10 is a diagram for explaining a method of partitioning space into subspaces.

FIG. 10 is a diagram for explaining how an image space is partitioned into eight subspaces $V_1$ to $V_8$. The sub-image for the respective subspace $V_i$ is generated by each of the node computers 231 to 238. The number of subspaces is not specifically limited, but to make effective use of the image merging circuits, it will be advantageous to divide the image space into a plurality of subspaces, in particular, $2^{3n}$ subspaces (where n is a positive integer).

Figure 11:
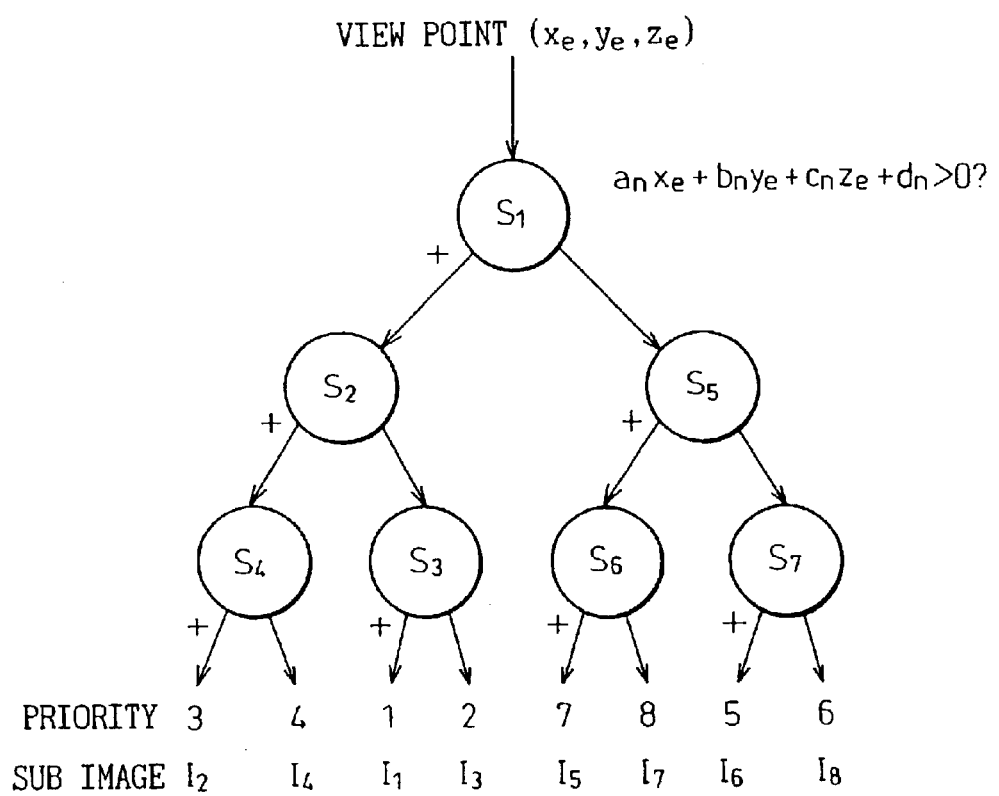
FIG. 11 is diagram showing a binary space partitioning tree representation.

FIG. 11 is a binary space partitioning tree representation of the subspaces, showing the arrangement of the subspaces Vi as viewed from the viewpoint.

Because the image $I_1$ corresponding to the subspace $V_1$ is closest to the viewpoint, priority "1" is assigned, and other priorities are assigned in the order of the images $I_3, I_2, I_4, I_6, I_8, I_5$ and $I_7$. The priority can be determined by discriminating the sign of $$a_m X_e + b_m Y_e + c_m Z_e + d_m$$

with respect to the planes separating the respective subspaces. Here, ($X_e$, $Y_e$, $Z_e$) are the coordinates of the viewpoint, and ($a_m$, $b_m$, $c_m$, $d_m$) are the coefficients determined according to the planes separating the respective subspaces.

Figure 12:
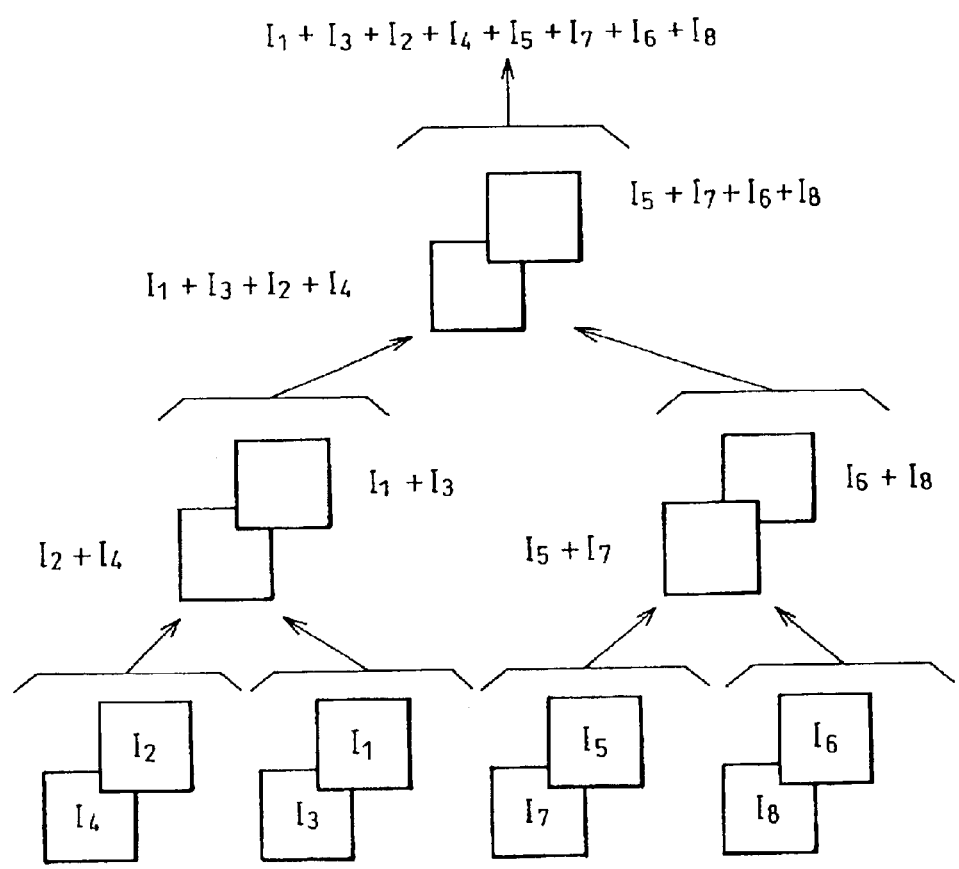
FIG. 12 is a diagram for explaining an image blending process.

FIG. 12 is a diagram for explaining how the sub-images $I_1$ to $I_8$ are composed. The eight sub-images $I_1$ to $I_8$ can be composed by iteratively composing two sub-images in consideration of the fact that higher priority is given to the sub-images closer to the viewpoint.

According to the image composing apparatus of the present invention, each sub-image is given priority instead of the Z value, and image composing circuits for composing two sub-images in consideration for the priority are arranged in a layered structure to obtain high-speed image composition and high expandability.

Figure 13:
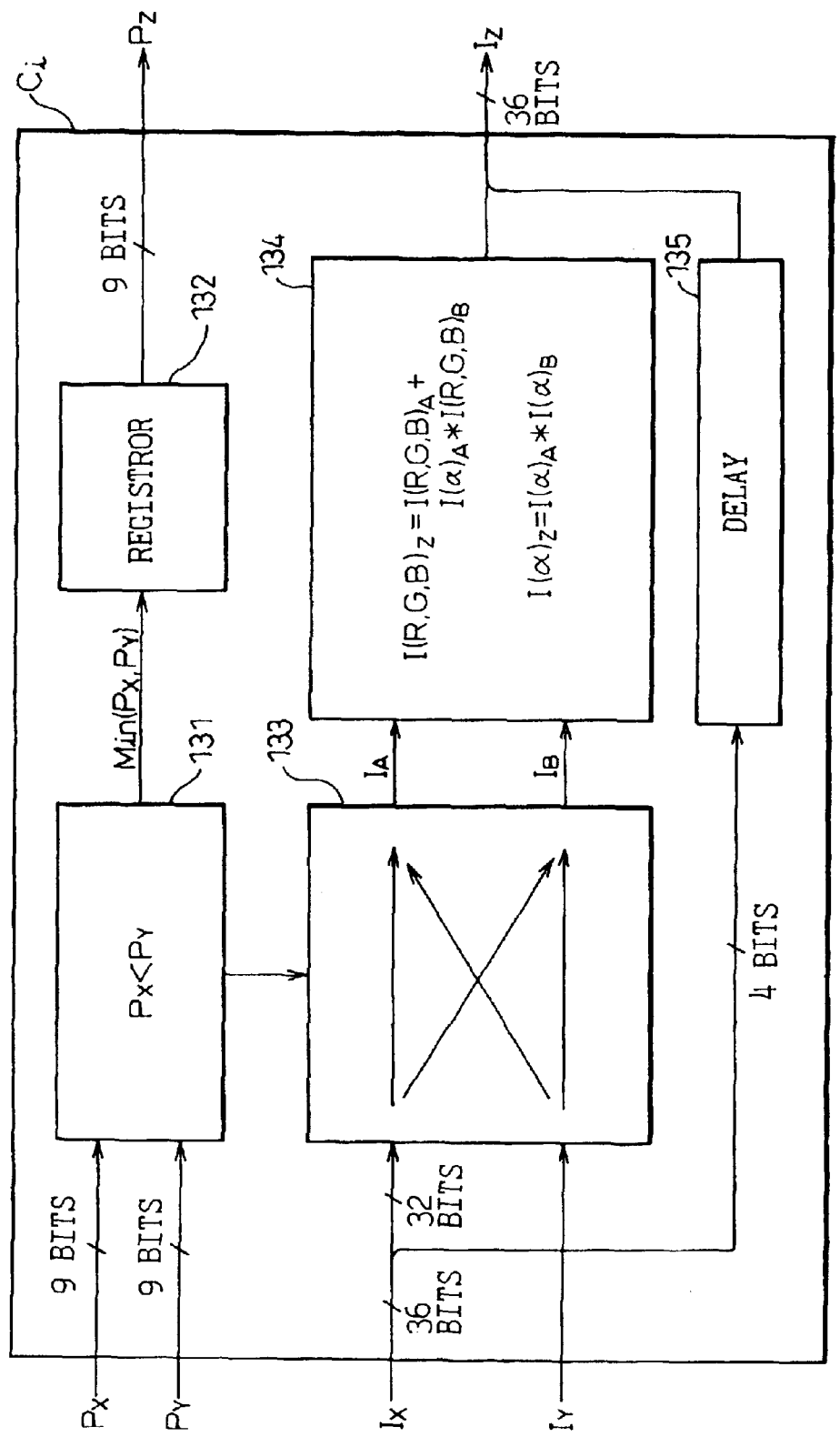
FIG. 13 is a diagram showing the configuration of an image merging circuit.
Figure 13:
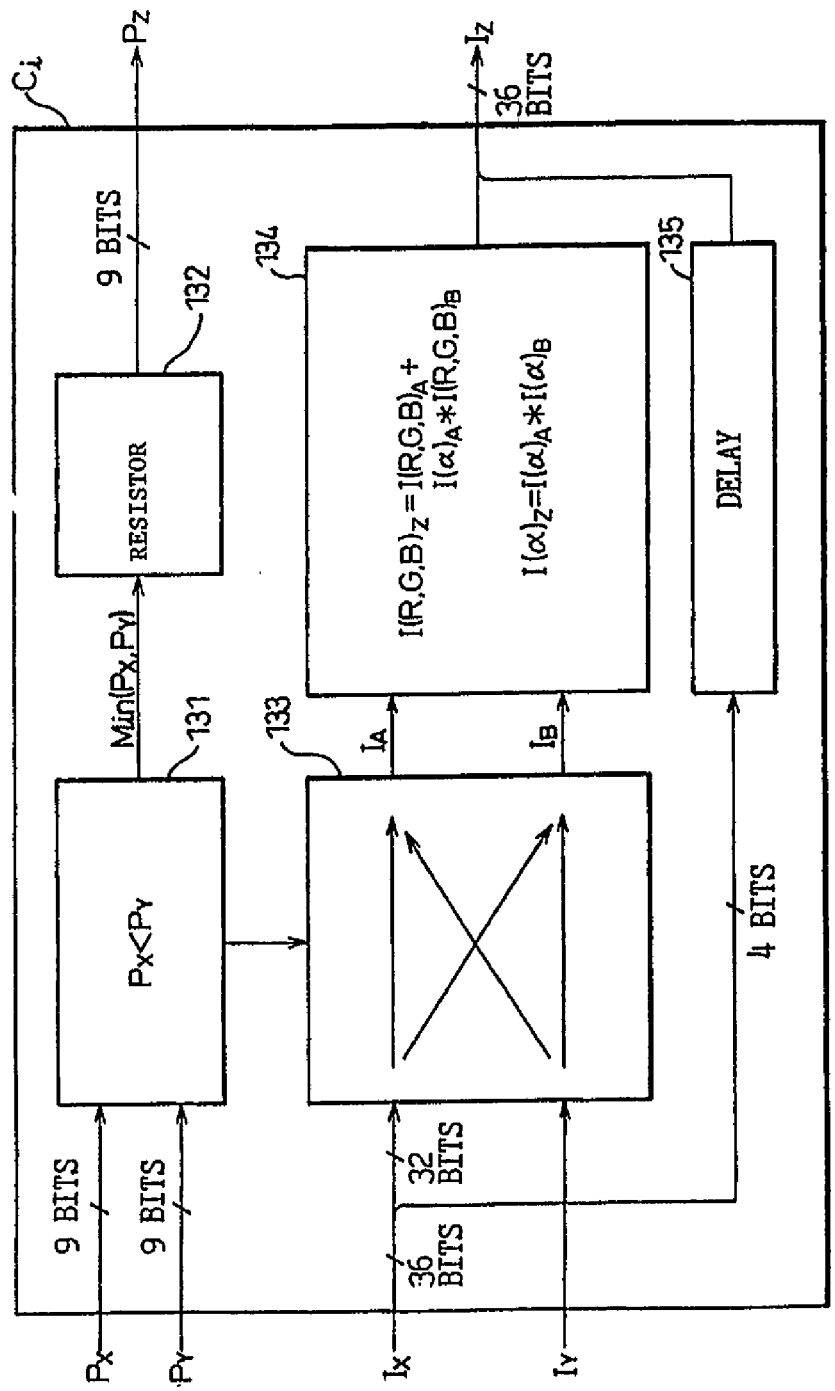

FIG. 13 is a diagram showing the configuration of each image composing circuit $C_i$, which comprises a comparator 131, a resistor 132, an interchanger 133, a composer 134, and a delay 135.

The comparator 131 compares the two priority values $P_X$ and $P_Y$ transferred from the synchronization circuit or the image merging circuits at the preceding stage, controls the interchanger 133 based on the result of the comparison, and outputs the smaller priority value (higher priority) as $P_Z$ through the resistor 132.

Based on the result of the comparison from the comparator 131, the interchanger 133 interchanges the two pixel data $I_X$ and $I_Y$ transferred from the synchronization circuit or the image merging circuits at the preceding stage.

For example, when the value of the set priority $P_Y$ for the sub-image $I_Y$ is smaller than the value of the set priority $P_X$ for the sub-image $I_X$, that is, when the sub-image $I_Y$ is given higher priority, cross paths are selected, and the sub-images $I_X$ and $I_Y$ are set as follows.

$$I_Y \rightarrow I_A$$

$$I_X \rightarrow I_B$$

Conversely, when the value of the set priority $P_Y$ for the sub-image $I_Y$ is larger than the value of the set priority $P_X$ for the sub-image $I_X$, that is, when the sub-image $I_X$ is given higher priority, then straight paths are selected, and the sub-images $I_X$ and $I_Y$ are set as follows.

$$I_X \rightarrow I_A$$

$$I_Y \rightarrow I_B$$

The composer 134 generates composed pixel data $I_Z$ by composing the two pixel data $I_A$ and $I_B$ in accordance with the composing equation shown below.

$$I(R,G,B)_Z = I(R,G,B)_A + I(\alpha)_A * I(R,G,B)_B$$

$$I(\alpha)_Z = I(\alpha)_A * I(\alpha)_B$$

where $I(R,G,B)_Z$ is the red, green, and blue component data of the composed pixel data $I_Z$, and $I(\alpha)_Z$ is the transparency of the composed pixel data $I_Z$.

Finally, the composite pixel data $I_Z$ is generated by storing $I(R,G,B)_Z$ in No. 31–8 bits and $I(\alpha)_Z$ in No. 7–0 bits, and is output.

The high four bits of the 36-bit pixel data are set to "1" for denoting that the data is pixel data, and the bits to be processed by the interchanger 133 and the composer 134 are the low 32 bits. Therefore, the high four bits are directly transferred through the delay 135 to the output side of the composer 134 and combined with the output of the composer 134 to reproduce the 36-bit pixel data. The delay time of the delay is set equal to the processing time required in the interchanger 133 and the composer 134.

As described above, the seven image composing circuits are arranged in three layers and the eight sub-images are composed to one image.

However, as the pixel data and the priority value are separately processed in each image composing circuit in the image composing circuit in the first-layer-third-layer, the pixel data and the priority value are also separately output from the image composing circuit $C_7$ in the third-layer image composing section 243.

Therefore, to standardize the configuration of the image composing apparatus of the present invention, the image combing circuit 244 (FIG. 3) arranged at the final stage of the image composing apparatus adds the frame start and the frame sense at the head of the pixel data output from the image merging circuit $C_7$ and the frame end at the tail of the data to reconstruct the data format shown in FIG. 8. Further, the priority set determined based on the priority value output from the image merging circuit $C_7$ is added in the front of the frame data.

By applying the above configuration, the image composing apparatus of the present invention (in the above embodiment, the apparatus for composing eight sub-images into one image) produces the output frame of the same format as the input frame, and it becomes possible to increase the number of images to be composed by arranging the above image composing apparatuses in a layered structure.

FIG. 14 is a configuration of a multi-layer sub-image composing apparatus constructed by arranging 8-input and 1-output image composing apparatuses in a layered structure. When the number of sub-images to be input is denoted by N, the number of layers S is given by the following equation.

$$S = \mathrm{Ceil}(\log_2 N)$$

While the above description has dealt with an image composing apparatus for composing sub-images electrically, a plurality of display devices may be arranged side by side and the sub-images may be composed visually by displaying the outputs of the synchronizing section directly on the respective display apparatuses and thus operating the plurality of display devices as a single display apparatus.

According to the image composing apparatus and method of the present invention, as the sub-images are composed based on the occlusion relationship between them, it becomes possible to easily cope with an increase in the number of sub-images to be merged.

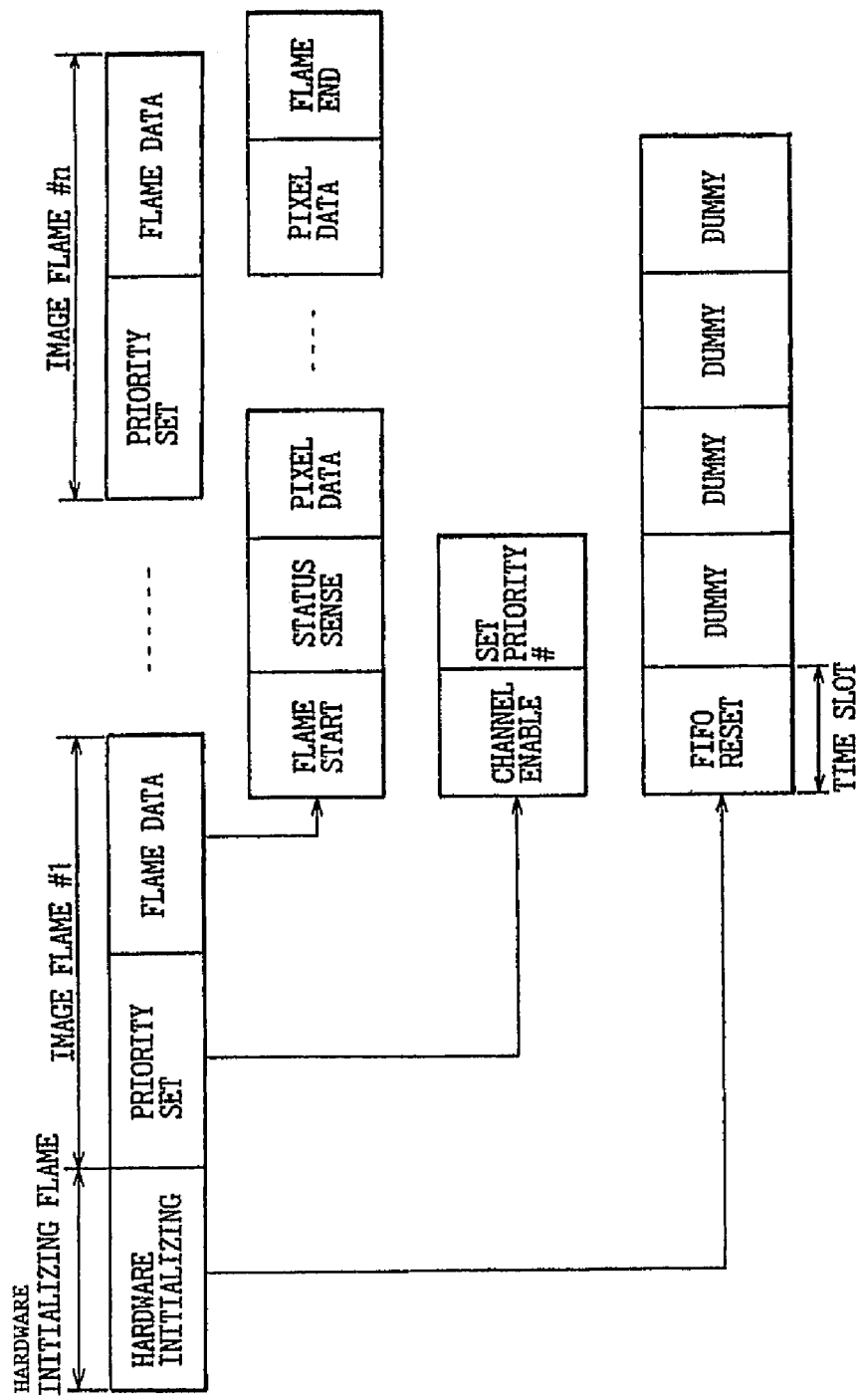

What is claimed is:

1. An image composing apparatus for merging a plurality of sub-images into a single image, comprising:
   a sub-image input means for receiving said plurality of sub-images in parallel;
   a synchronizing means for synchronizing said plurality of sub-images received at said sub-image input means; and
   an image merging means for processing said plurality of sub-images synchronized by said synchronizing means in parallel to merge said plurality of sub-images into a single image;
   wherein said image merging means comprises a plurality of two sub-image merging means arranged in a hierarchical manner, each of which merges two sub-images into a single image based on the priority between the two sub-images, and wherein merged images of previous stages comprise input sub-images of a next stage.

2. An image composing apparatus as claimed in claim 1, wherein each of said two sub-image merging means comprises:
   a priority judging means for judging a priority between said two sub-images;
   a switching means for switching connections between two input images and two output images based on a result of the judgement made by said priority judging means; and
   an image composing means for merging together said output images output from said switching means to generate a merged image in accordance with a merging equation and outputting said merged image.

3. An image composing apparatus as claimed in claim 2, wherein said image composing means merges first and second sub-images to generate said merged image in accordance with the following equation.

$$I_C = A_A * IB + I_A$$

$$A_C = A_A * A_B$$

where $I_A$ is a brightness of said first sub-image, $A_A$ is a transparency of said first sub-image, IB is a brightness of said second sub-image, $A_B$ is a transparency of said second sub-image, $I_C$ is a brightness of said merged image and $A_C$ is a transparency of said merged image.

4. An image composing method for merging a plurality of sub-images into a single image, comprising:

a sub-image input step for receiving said plurality of sub-images in parallel;

a synchronizing step for synchronizing said plurality of sub-images received at said sub-image input step; and an image merging step for processing said plurality of sub-images synchronized at said synchronizing step in parallel to merge said plurality of sub-images into a single image;

wherein said image merging step comprises a plurality of two sub-image merging steps arranged in a hierarchical manner, each of which merges two sub-images into a single image based on a priority between the two sub-images, and wherein merged images of previous steps comprise input sub-images of a next step.

5. An image composing method as claimed in claim 4, wherein each of said two sub-image merging step comprises:

a priority judging step for judging a priority between said two sub-images;

a switching step for switching a relationship between two input images and two output images based on a result of the judgement made by said priority judging step; and an image composing step for merging together said output images switched at said switching step to generate a merged image in accordance with a merging equation and outputting said merged image.

6. An image composing method as claimed in claim 5, wherein at said image composing step, first and second sub-images are merged to generate said merged image in accordance with the following equation.

$$I_C = A_A * IB + I_A$$

$$A_C = A_A * A_B$$

where $I_A$ is a brightness of said first sub-image, $A_A$ is a transparency of said first sub-image, IB is a brightness of said second sub-image, $A_B$ is a transparency of said second sub-image, $I_C$ is a brightness of said merged image and $A_C$ is a transparency of said merged image.

* * * * *

UNITED STATES PATENT AND TRADEMARK OFFICE
CERTIFICATE OF CORRECTION

| | | |
|---|---|---|
| PATENT NO. | : 6,956,585 B2 | |
| APPLICATION NO. | : 10/291854 | |
| DATED | : October 18, 2005 | |
| INVENTOR(S) | : Muraki et al. | |

It is certified that error appears in the above-identified patent and that said Letters Patent is hereby corrected as shown below:

On the Title Page

(56) References Cited                          After "Nov. 10-16,",
Other Publications                              Insert --2001,--
Muraki, et al.., Next-Generation
Visual. . .

(57) Abstract, line 7                           Before "each other",
                                                Insert --to--

In the Claims

Column 9, line 6, Claim 3                       Delete ".",
                                                Insert --:--

Column 10, line 4, Claim 5                      Delete "step",
                                                Insert --steps--

Column 10, line 19, Claim 6                     Delete ".",
                                                Insert --:--

The sheets of drawings consisting of figures 8 and 13 should be deleted to appear as per attached figures 8 and 11.

Signed and Sealed this

Thirteenth Day of November, 2007

JON W. DUDAS
*Director of the United States Patent and Trademark Office*